Nov. 8, 1960  W. P. STRICKLAND, JR  2,959,087
PRECISION OPTICAL MEASURING DEVICE
Filed Oct. 31, 1956  4 Sheets-Sheet 1

Inventor
William Palmer Strickland, Jr.
Attorney

Nov. 8, 1960  W. P. STRICKLAND, JR  2,959,087
PRECISION OPTICAL MEASURING DEVICE
Filed Oct. 31, 1956  4 Sheets-Sheet 2
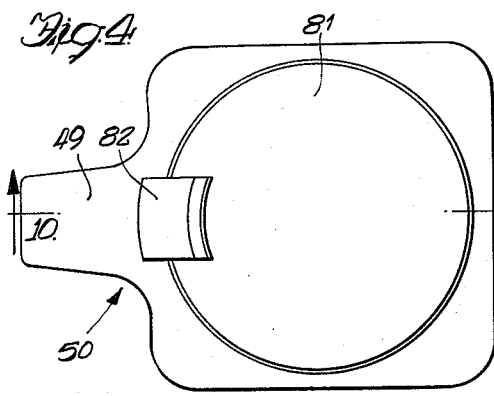
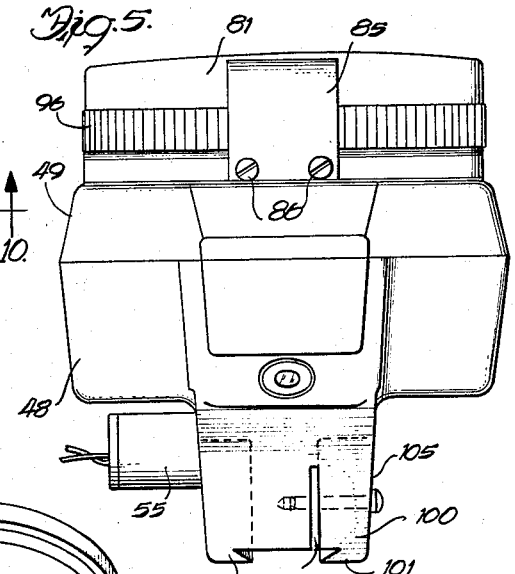
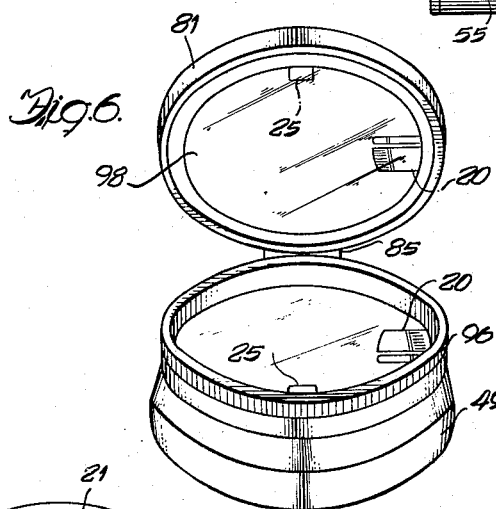
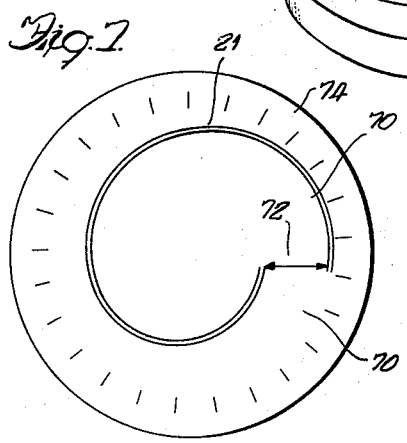
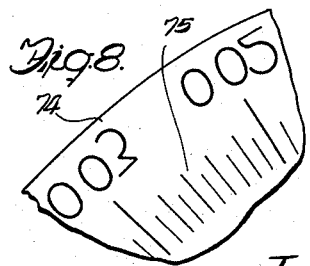
Inventor
William Palmer Strickland Jr.
Attorney Nov. 8, 1960     W. P. STRICKLAND, JR     2,959,087
PRECISION OPTICAL MEASURING DEVICE
Filed Oct. 31, 1956     4 Sheets-Sheet 3
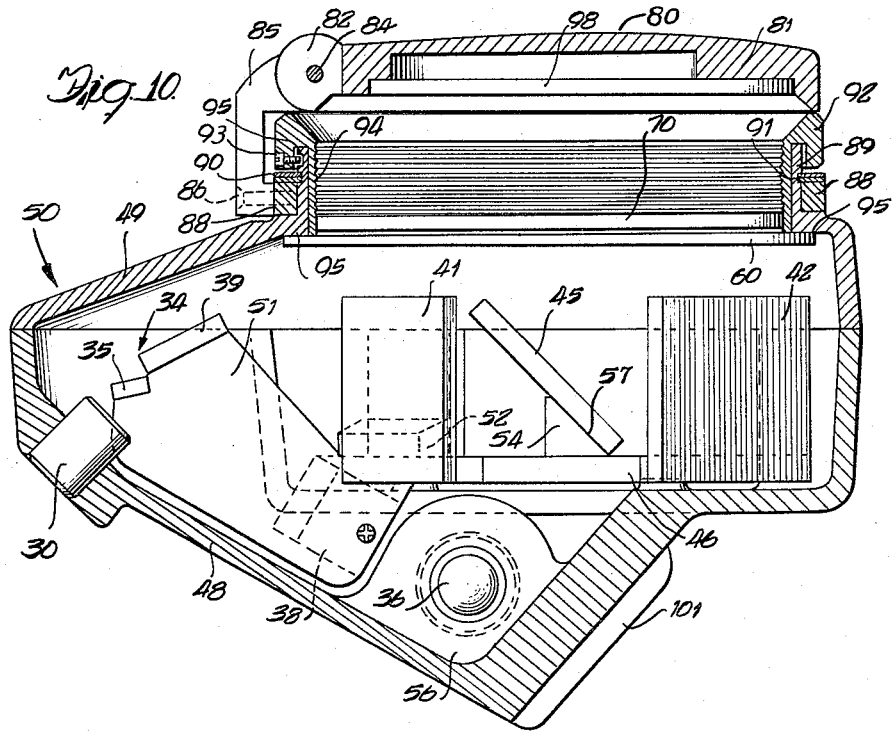
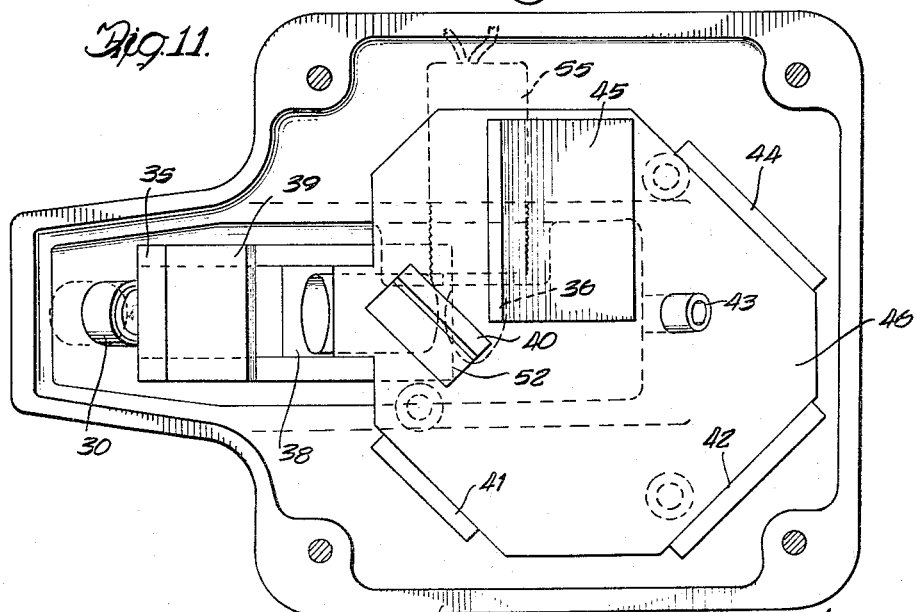
Inventor
William Palmer Strickland, Jr.
Jack E. Dominik
Attorney Nov. 8, 1960      W. P. STRICKLAND, JR      2,959,087
PRECISION OPTICAL MEASURING DEVICE
Filed Oct. 31, 1956      4 Sheets-Sheet 4
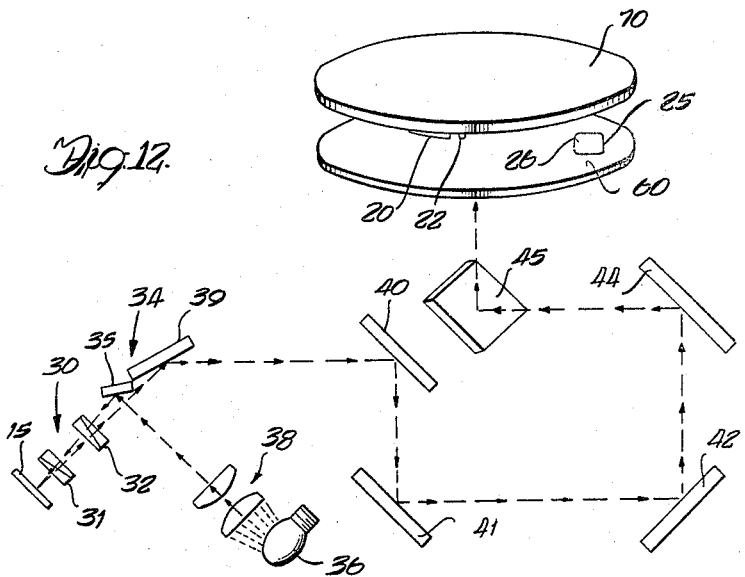
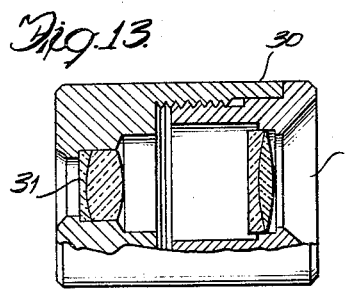
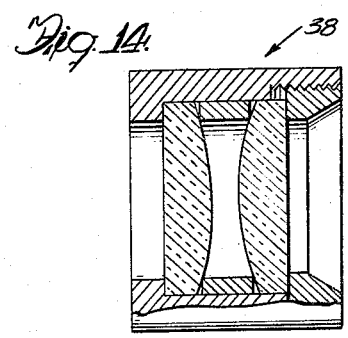
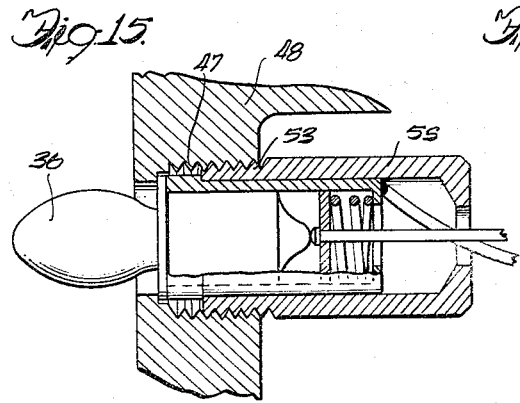
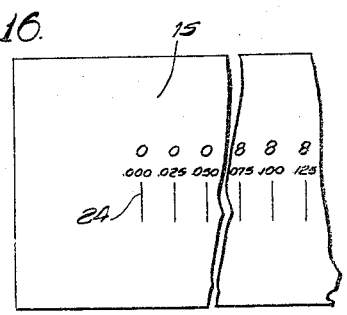
Inventor
William Palmer Strickland, Jr.
Attorney

United States Patent Office 2,959,087
Patented Nov. 8, 1960

2,959,087

PRECISION OPTICAL MEASURING DEVICE

William Palmer Strickland, Jr., Chicago, Ill., assignor to Simpson Optical Manufacturing Co., Chicago, Ill.

Filed Oct. 31, 1956, Ser. No. 619,481

8 Claims. (Cl. 88—1)

The present invention relates to precision measuring equipment, and more specifically to optical equipment for such purposes. In particular the present invention contemplates an optical reader and vernier which operates in conjunction with a linear scale when mounted, for example, on a machine tool bed to permit the easy and accurate measurement of the travel of the bed.

In the machine tool field where moving bed tools are involved, equipment costs are greatly increased as bed travel tolerance measurement is decreased. Most of the attempts to increase the accuracy in measuring or regulating bed travel have been devoted to precise regulation of the travel drive.

The present invention, however, proceeds on a different theory in that it contemplates an external measuring unit in the form of an optical reader, usually mounted on a fixed portion of the machine tool, and a scale mounted to the moving bed the position of which is read on the reader. Similar optical systems heretofore proposed often require the operator to take his reading from various stations: part from the scale, and part from the reader. This, of course, can induce errors in addition and subtraction which will be reduced with a direct reading instrument. Also such units normally employ internal moving parts which may not be within the limits of accuracy required, or become quite costly when they must be manufactured to close tolerances.

The present invention has for its general object providing an optical reader and scale which permits a determination of the location of the reader with reference to the scale by adjustments made on a single viewer where the indicia from the scale are also read.

Another object of the invention is to furnish an optical reader the critical parts of which are practically impervious to wear thereby insuring accuracy for a lifetime of use.

A further object of the invention is to provide an optical reader which is sealed thereby preventing spillage of oil or coolant from its associated machine from entering the optical system and destroying the image quality.

Yet another object of the invention is to provide an optical reader which can be readily checked before use for absolute accuracy to its designed tolerance.

Further objects and advantages of the present invention will become apparent as the following description of an illustrative embodiment proceeds taken in conjunction with the accompanying drawings in which:

Fig. 4 is a front view of the reader shown in Fig. 3 in reduced scale.

Fig. 5 is a top view of the reader shown in Fig. 3.

Fig. 6 is a front partially broken view in enlarged scale showing the reader in the same attitude as illustrated in Fig. 4, but revealing its inner parts more fully.

Fig. 7 is a plan view of the transparent vernier lens showing the spiral index and circumferential graduations.

Fig. 8 is an enlarged broken view showing in greater detail the circumferential index on the vernier lens illustrated in Fig. 7.

Fig. 9 is an end view of the vernier lens shown in Figs. 7 and 8.

Fig. 10 is a front elevation in partial section showing the housing for the reader as well as the interior optical system taken along section line 10—10 of Fig. 4.

Fig. 11 is a front elevation of the lower half of the reader housing showing the optical system illustrated in Fig. 10 in plan view.

Fig. 12 is a diagrammatic view of the optical system employed in the reader.

Fig. 13 is an enlarged partial section of the condenser cell.

Fig. 14 is an enlarged partial section of the light condenser assembly.

Fig. 15 is an enlarged partial section of the light assembly.

Fig. 16 is an enlarged broken view of the scale illustrating how the measuring indicia are placed thereon.

In broad outline the invention contemplates a combination of a scale and an optical reader. In normal operation the scale and reader are mounted on parts which move relative to each other, one of which is usually fixed. The measuring indicia on the scale at any point of travel is picked up by light from a lamp and a condensing lens in the reader and reflected onto a mask having a viewing window, a sighting slit, and a vernier window. A transparent vernier with a spiral etched on its face is rotated until the spiral is fixed with relation to the dimensional mark showing through the sighting window. Circumferential vernier marks on the vernier are then read at the vernier window and added to the dimensional indicia appearing in the viewing window to find the precise location of the scale with respect to the reader.

Figure 1:
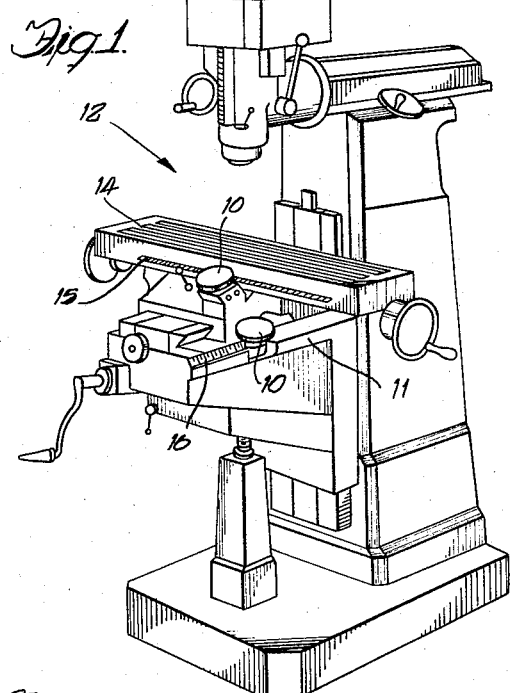
Figure 1 is a perspective view of a milling machine on which the optical measuring device has been attached to measure the travel of the moving bed.

A practical employment of the invention is best illustrated in the usage to which it has been put on a milling machine in Fig. 1 in the accompanying drawings. There it will be seen that a pair of optical readers 10 have been mounted to the fixed arm 11 of a mill machine 12 in order to accurately measure the travel of the bed 14. The bed travel reader 10 operates in conjunction with the bed scale 15, and the cross feed reader 10 operates in conjunction with the cross feed scale 16. In operation the machinist measures accurately the starting position of the bed 14, and then after noting the first reading moves the bed to a second position which may also be read accurately on the optical readers 10.

In one commercial embodiment of the invention the dimensional travel of the bed 14 can be read to the nearest 10,000th of an inch. Because the reading is predicated on the precise position of a scale, lost motion in the lead screw assembly or cross feed screw assembly are fully compensated in the ultimate reading. For example, the reader will record as much as a .0005" travel of the machine tool bed when the bed is locked into position without any observable change in the position of the lead screw.

Figure 2:
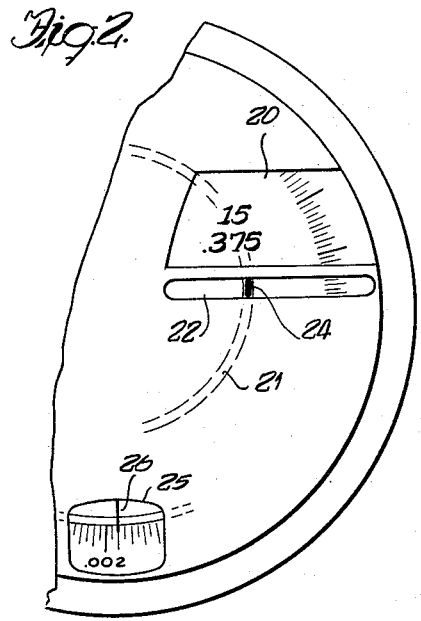
Fig. 2 is a broken enlarged plan view illustrating how the dimension on the scale is read directly on the reader.

Before going into the details of construction of the reader and its associated scale, it will be helpful to first observe how one reading may be made from the dial. Referring now to Fig. 2, it will be seen that in the dimensional window 20 the dimension 15.375" is read. This reading is picked up directly from the associated scale 15 on the machine tool. The vernier lens spiral 21 is then rotated into position over the sighting window 22 until the sighting mark 24 is midway between the edges of the spiral 21. Then one's attention is directed to the vernier window 25 where the vernier index mark 26 appears over the mark for .0022". By adding the vernier dimension to the dimension appearing in the window 20 the total dimension is 15.3772". Obviously the vernier can be either preset to a particular dimension and the machine tool bed moved to that point, or, after the machine tool bed has been locked in a particular position, the precise dimension at that point may be read as described above.

By employing a unique optical system which splits and folds the image pick-up off the scale, a high fidelity of reproduction can be produced in the viewer within strict dimensional tolerances. Referring now to Fig. 12, a diagrammatic view of the optical system, it will be seen that the intelligence off the scale 15 is picked up by the image magnification cell 30 comprising two pairs of optical members 31, 32 and reflected on to a split reflector 34. The light reflector 35 picks up the rays transmitted by the illuminating bulb 36 through the condenser lens system 38 and transmits the light through the magnification system 30 onto the scale 15 from which the light is reflected to the number one folding mirror 39. Thereafter the illuminated image is reflected by five additional mirrors until it is projected directly into the viewing window 20 and read by the machine operator. By conveniently placing an additional hole in the vernier housing, as will be outlined in detail later, the light bulb 36 also serves to illuminate the vernier window 25.

As will be readily observed from Fig. 12 four of the folding mirrors 40, 41, 42, 44 are positioned to effect a perpendicular reflection in a common plane. The fifth mirror 45 is angled to reflect the image in a course perpendicular to the plane of reflection effected by the mirrors 40, 41, 42, and 44.

The basic optical system, as will be seen by reference to Figs. 10 and 11, permits all of the mirrors to be fixed to a single machined mounting plate 46 thereby insuring greater accuracy and facilitating inexpensive assembly. Referring now to Fig. 10, it will be seen that the magnification or collector lens system 30 is fixed firmly to the lower half 48 of the housing 50. The upper half 49 of the housing 50 serves to hold the viewing members as will be pointed out later. The split mirror combination 34 is mounted on the support yoke 51 with the light mirror 35 and image mirror 39 secured at the ends of the support yoke 51. The number 1 folding mirror 40 is secured in place on the mounting plate 46 by means of a support block 52. The three succeeding mirrors 41, 42, 44 are mounted to the edges of the mounting plate 46. The inclined final reflecting mirror 45 is supported by a block 54 secured also the mounting plate 46 and having an inclined face 57 which controls the angularity of the final reflecting mirror 45. The light bulb 36 is mounted transversely in the base of the lower housing 48 and positioned to direct its rays into the condenser lens 38 from which the light reflecting split mirror 35 directs the rays down onto the scale. The light bulb mounting socket 55, to be described in detail later, rests in the lower transverse groove 56 of the lower housing 48.

The image leaves the final inclined mirror 45 and is transmitted to the viewing window 20 of the mask 60, the dimensional marks being picked up through the sighting window 22 as outlined above. The radial scale reading window 25 is also provided on the mask 60. The radial scale window 25 is backlighted by providing a light port 47 in the mirror mounting plate 46. The light port 47 confines the light from the bulb 36 for direction onto the radial indicia window 25. The windows are clear glass whereas the remainder of the mask is opaque. The opacity is supplied by plating with a suitable metallic material. The radial scale and spiral are both etched on the lower surface of the lens 70 which is ground for translucence, it being appreciated that the vernier lens 70 is mounted for rotation whereas the remaining elements of the optical system are fixed. Although the lens 70 is ground and the mask 60 opaque, this arrangement can be reversed. In addition, the mask 60 can be the outer member with the rotating spiral lens 70 the inner member.

The rotation of the vernier lens 70 and its associated spiral 21 is accomplished through the construction of the cap assembly 80 which is also illustrated in Fig. 10. There it will be seen that the cap 81 has a hinged rear portion 82 which permits it to rotate in opening on hinge pin 84. The hinge pin is supported by the hinge mount 85 which in turn is secured to the rotating ring 88 by a pair of through bolts 86 at its lower portion. The ring 88 abuts the cylindrical mounting sleeve 89 which extends up from the upper housing 49. A snap ring assembly 90 fits into the mounting sleeve groove 91 thereby holding the cap mounting ring 88 in position for complete 360° rotation on its mount.

The vernier lens 70 is similarly mounted for 360° rotation, it being secured within the vernier lens collar 92 which has an inner cylindrical portion 94 which abuts the inner face of the mounting sleeve 92. The vernier lens mounting sleeve 92 is secured in place by means of a locking screw 93 which extends into the vernier sleeve retaining groove 95. It will be seen that this permits the vernier lens 70 to rotate in a plane parallel and immediately adjacent to the plane of the mask 60, the mask 60 being firmly secured to the upper housing 49 at the upper housing mask mounting shoulder 95. The peripheral rim 96 of the vernier mounting sleeve 92 is corrugaged to permit easy grasp for rotation even though the hands of the operator may be greasy. A mounting cap reflecting mirror 98 is embedded in the upper portion of the cap 81 to permit the operator to view the reading without looking directly down on the vernier lens as best illustrated in Fig. 6.

Figure 3:
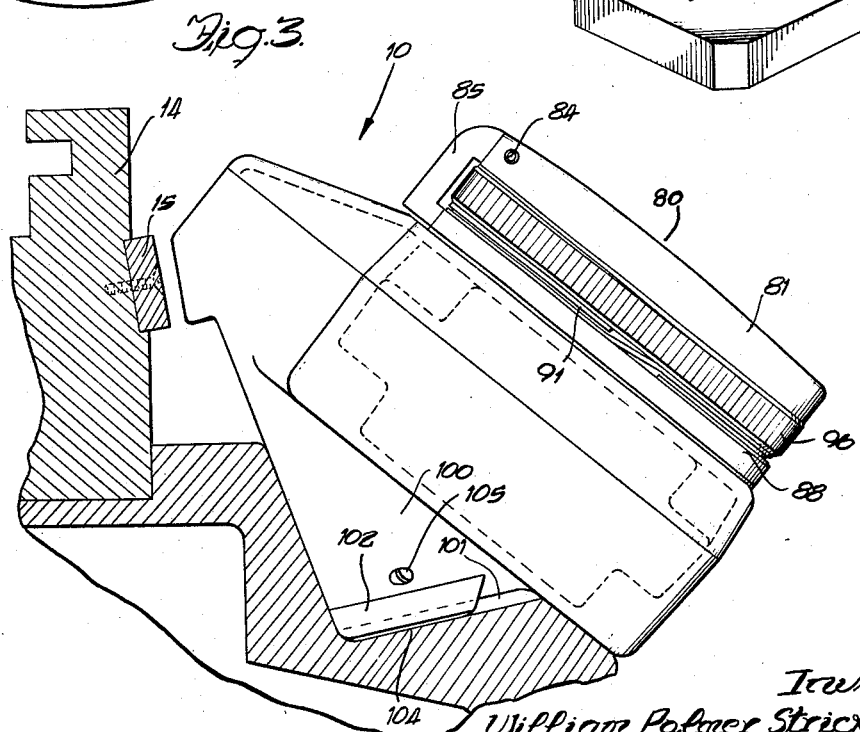
Fig. 3 is an end view of the optical reader showing associated portions of the machine tool in partial section.

For best operation the reader 10 should be firmly mounted to a fixed portion of the associated machine as illustrated in Fig. 5, the mounting base portion 100 of the lower housing 48 has a pair of dovetailed feet 101 which fit into a mating mount 102 secured to a flat surface 104 on the machine tool. A cross bolt 105 tightens the dovetail feet 101 to secure the mount by narrowing the slit 106 in the mounting base. In this manner the reader assembly 10 is firmly fixed to the associated machine tool. The scale 15, as will be seen in Fig. 3 is mounted to the machine tool bed so that it moves in a plane carrying the trace of the collector lens system 30.

As will be seen in Fig. 16, the scale contains a plurality of dimensional indicia 24 plus numbers above each of the indicia 24 indicating its relative position on the scale. In the particular embodiment shown, the distance between each of the measuring indicia 24 on the scale 15 is .025". Although straight lined indicia 24 have been shown dots or other markings may be similarly used.

The spiral lens 70 is shown in Figs. 7, 8 and 9. In Fig. 7, showing the underside 71 of the lens 70, it will be seen that the spiral 21 is a pair of parallel lines. The spiral is so proportioned that the distance 72 between its overlapping portions is equivalent to the distance between two of the dimensional indicia 24 on the measuring scale 15 as transmitted through the optical system onto the sighting window 22 of the mask 60.

The vernier reference indicia 74, shown in enlarged scale in Fig. 8, are for each .001″ with intermediate micro-reference indicia 75, each one of which represents a .0001″. The line widths, depths, and lengths are determined in accordance with the specifications of the various manufacturers and users.

The collecting lens system 30 and the condenser lens system 38 are shown in Figs. 13 and 14, respectively. The collecting lens contemplates a concave-convex combination 31 and a second pair of refractors 32. The light condenser lens system 38 contemplates a pair of convex lenses with their convex surfaces facing each other as illustrated in Fig. 14.

The light bulb 36 as shown in Fig. 15 is adapted for easy removal from the lower housing 48 as the socket 55 is threaded at its forward portion 53 to fit within the threaded bore 47 of the lower housing 48. This permits removal and replacement of the bulb 36 without disturbing the reader 10, while at the same time protecting the light bulb 36 from damage as well as dirt which would render it less effective.

It will be readily seen from Fig. 10 that by sealingly mounting the outer lens 70 within the mounting sleeve 92, that the opening to the interior portion of the reader is effectively sealed. If oil or other contamination is spilled upon the reader, even after the cap 81 is opened, it can be cleaned by wiping the upper face of the outer lens 70 without even removing the lens. Should additional contamination enter the system, the sealing of the mask 60 to the upper housing 49 of the unit body 50 further insures against contamination of the internal optical system, the only entry to the system being achieved through removing the light bulb socket 55.

In review it will be seen that an optical reader has been shown which permits extreme accuracy in reading a dimensional double checking by means of obtaining a centering of the measuring indicia through the sighting window before use. The optical spiral can be accurate for each mask manufactured on a mass scale. The internal mirror system is keyed to a single mounting plate which can be machined to extreme accuracy, thereby permitting rapid mounting of the mirrors to the basic plate. Because the critical elements in dimensional tolerances are engraved, expensive machined parts are held to an irreducible minimum. The design of the structure is such that excellent sealing against normal machine shop dirt and contamination has been provided.

Although a particular embodiment of the invention has been shown and described in full here, there is no intention to thereby limit the invention to the details of such embodiment. On the contrary, the intention is to cover all modifications, alternative embodiments, usages and equivalents of the precision optical measuring device as fall within the spirit and scope of the invention, specification, and appended claims.

I claim as my invention:

1. An optical reader for use in conjunction with a linear scale having uniformly spaced marks, each of the spaced marks having associated dimensional indicia, the reader comprising a housing, means for mounting the housing to a bed for movement relative to the linear scale, light collecting means oriented to form images of the spaced marks on the linear scale and their associated dimensional indicia, a mask having viewing windows including a sighting slit and an indicia window, a means for projecting the image formed by the collecting means onto the viewing windows so that the spaced marks show up in the sighting slit and the dimensional indicia in the indicia window, a light transmitting circular member mounted for rotation in superposed relation to the mask, a spiral index means fixed on the circular member, the distance between the radially overlapping portions of the spiral being equal to the distance between the spaced marks on the scale as viewed on the mask sighting window, radial indicia on the circular member proportioned to progressively read the relative lateral travel of the spiral as the circular member is rotated to bring the spiral into predetermined fixed relation to the projected marks on the scale as viewed through the sighting slit, and fixed sighting indicia on the mask to read the graduations on the radial scale when the spiral has been brought into predetermined relationship with the distance mark projections thereby providing a reading for the space traversed between the uniformly spaced marks on the fixed scale.

2. An optical reader for use in conjunction with a linear scale having uniformly spaced marks, each of the spaced marks having associated dimensional indicia, the reader comprising, in combination, a housing, means for mounting the housing to a bed for motion relative to the linear scale, light collecting means oriented to form images of the spaced marks on the linear scale and their associated dimensional indicia, a mask having viewing windows including a sighting slit and an indicia window, a mirror system for reflecting the image formed by the collecting means onto the viewing windows so that the spaced marks show up in the sighting slit and the dimensional indicia in the indicia window, a light transmitting circular member mounted for rotation in superposed relation to the mask, a spiral index means fixed on the circular member, the distance between the radially overlapping portions of the spiral being equal to the distance between the spaced marks on the scale as viewed on the mask sighting window, peripheral radial indicia on the circular member proportioned to progressively read the relative lateral travel of the spiral as the circular member is rotated to bring the spiral into predetermined fixed relation to the projected marks on the sighting slit, and fixed sighting indicia on the mask to read the graduation on the peripheral radial scale when the spiral has been brought into predetermined relationship with the distance mark projections thereby providing a reading for the space traversed between the marks on the fixed scale.

3. An optical reader for use in conjunction with a linear scale having spaced marks, each of the spaced marks having associated dimensional indicia, the reader comprising a housing, means for mounting the housing to a bed for motion relative to the linear scale, a projection lens oriented to form images of the spaced marks on the linear scale and their associated dimensional indicia; a mask having viewing windows including a sighting slit, an indicia window, and a radial scale window; a mirror system for reflecting the image formed by the projection lens onto the viewing windows so that the spaced marks show up in the sighting slit and the dimensional indicia in the indicia window, a light transmitting circular member mounted for rotation in superposed relation to the mask, a spiral index means fixed on the circular member, the distance between the radially overlapping portions of the spiral being equal to the distance between the spaced marks on the scale as viewed on the mask sighting window, peripheral radial indicia on the vernier proportioned to progressively read the relative lateral travel of the spiral as the circular member is rotated to bring the spiral into predetermined fixed relation to the projected marks on the scale as viewed through the sighting slit, and fixed sighting indicia on the mask radial scale mirror to read the graduations on the peripheral radial scale when the spiral has been brought into predetermined relationship with the distance mark projections thereby providing a reading for the space traversed between the marks on the fixed scale.

4. An optical reader for use with a scale having uniformly spaced marks and associated dimensional indicia comprising, in combination, a housing, a collecting lens mounted in the housing, a mirror plate within the housing, mirrors mounted to the mirror plate within the housing, mirrors mounted to the mirror plate for folding and reflecting the image formed by the collecting lens, a support ring on the housing, a mask mounted to the underside of the support ring thereby sealing the optical system, windows in the mask including a sighting window for receiving the projected image of the spaced marks on the scale and an indicia window for receiving the dimensional indicia, a light transmitting member superposed over the mask, a rotatable support ring for the light transmitting member proportioned for a journaled fit with support ring on the housing, a spiral index means fixed to the rotatable light transmitting member proportioned to uniformly traverse the projection of the uniformly spaced marking in the sighting window, radial indicia on the rotatable light transmitting member to divide the projected space between the uniformly spaced marks, and a fixed mark to read the divisions of the radial indicia.

5. An optical reader for use with a scale having uniformly spaced marks and associated dimensional indicia comprising, in combination, a housing, a collecting lens mounted in the housing, a mirror plate within the housing, mirrors mounted to the mirror plate for folding and reflecting the image formed by the collecting lens, a support ring on the housing, the axis of the ring being perpendicular to the plane of the mirror plate, a mask mounted to the underside of the support ring thereby sealing the optical system, windows in the mask including a sighting window for receiving the image of the spaced marks on the scale and an indicia window for receiving the dimensional indicia, as they are reflected by the mirrors, a light bulb mounted beneath the mirror plate, a mirror for reflecting the light from the light bulb down onto the scale from whence the lighted image returns through the mirror system, a light transmitting member superposed over the mask, a rotatable support ring for the light transmitting member proportioned for a journaled fit with support ring on the housing, a spiral index means fixed to the rotatable light transmitting member proportioned to uniformly traverse the projection of the uniformly spaced marking in the sighting window, radial indicia on the rotatable light transmitting member to divide the projected spaced between the uniformly spaced marks and a radial indicia window with an index mark for reading the radial scale.

6. In a reader of the character defined in claim 5 above, a port in the mirror plate oriented and proportioned to transmit light from the light bulb to illuminate the radial indicia window.

7. An optical reader for use in conjunction with a linear scale having uniformly spaced marks, each of the spaced marks having associated dimensional indicia, the reader comprising a housing, means for mounting the housing to a bed for movement relative to the linear scale, light collecting means oriented to form images of the spaced marks on the linear scale and their associated dimensional indicia, a mask, a dimensional indicia viewing window on said mask, a separate radial indicia viewing window on said mask, means for projecting the image formed by the collecting means onto the dimensional indicia viewing window so that the spaced marks and the dimensional indicia appear in said viewing window, a light transmitting circular member mounted for rotation in super-posed relation to the mask, a spiral index means fixed on the circular member, the distance between the radially over-lapping portions of the spiral being equal to the distance between the spaced marks on the scale as viewed on the mask window, radial indicia on the circular member proportioned to progressively read the relative lateral travel of the spiral as the circular member is rotated to bring the spiral into pre-determined fixed relation to the projected marks on a scale as viewed through the window, and fixed sighting indicia on the radial indicia viewing window to read the graduations on the radial scale when the spiral has been brought into pre-determined relationship with the projections of the spaced marks, thereby providing a vernier reading for the space traversed between the uniformly spaced marks on the fixed scale.

8. An optical reader for use in conjunction with a linear scale having uniformly spaced marks, each of the spaced marks having associated dimensional indicia, the reader comprising a housing, means for mounting the housing to a bed for movement relative to the linear scale, light collecting means onto the dimensional indicia viewing window marks on the linear scale and their associated dimensional indicia, a mask, a dimensional indicia viewing window on said mask, a radial indicia viewing window on said mask, means for projecting the image formed by the collecing means onto the dimensional indicia viewing window so that the spaced marks and the dimensional indicia appear in said viewing window, light means within said housing, optical means for transmitting said light means onto the linear scale and thereby illuminating the image formed by the collecting means, a light transmitting circular member mounted for rotation in super-posed relation to the mask, a spiral index means fixed on the circular member, the distance between the radially overlapping portions of the spiral being equal to the distance between the spaced marks on the scale as viewed on the mask window, radial indicia on the circular member proportioned to progressively read the relative lateral travel of the spiral as the circular member is rotated to bring the spiral into pre-determined fixed relation to projected marks on the scale as viewed through the window, and fixed sighting indicia on the radial indicia viewing window to read the graduations on the radial scale when the spiral has been brought into pre-determined relation with the projections of the spaced marks, light transmitting means associated with said illuminating means whereby the radial indicia viewing window is back-lighted to assist in reading the graduations on the radial scale and their relationship with the fixed sighting indicia, the whole in such combination as to provide a vernier reading for the space traversed between the uniformly spaced marks on the fixed scale.

References Cited in the file of this patent

UNITED STATES PATENTS

| | | |
|---|---|---|
| 2,043,625 | Lindner | June 9, 1936 |
| 2,488,351 | Turrettini | Nov. 15, 1949 |
| 2,497,981 | De Gramont | Feb. 21, 1950 |

FOREIGN PATENTS

| | | |
|---|---|---|
| 999,123 | France | Oct. 3, 1951 |
| 911,548 | Germany | May 17, 1954 |

UNITED STATES PATENT OFFICE
CERTIFICATION OF CORRECTION

Patent No. 2,959,087 November 8, 1960

William Palmer Strickland, Jr.

It is hereby certified that error appears in the above numbered patent requiring correction and that the said Letters Patent should read as corrected below.

Column 6, lines 71 and 72, strike out "mirrors mounted to the mirror plate within the housing,"; column 8, line 20, for "onto the dimensional indicia viewing win-" read -- oriented to form images of the spaced --; line 25, for "collecing" read -- collecting --.

Signed and sealed this 3rd day of April 1962.

(SEAL)
Attest:

ERNEST W. SWIDER
Attesting Officer

DAVID L. LADD
Commissioner of Patents